United States Patent
Kennedy

(10) Patent No.: US 7,941,863 B1
(45) Date of Patent: May 10, 2011

(54) DETECTING AND PREVENTING EXTERNAL MODIFICATION OF PASSWORDS

(75) Inventor: Mark Kevin Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 883 days.

(21) Appl. No.: 11/863,032

(22) Filed: Sep. 27, 2007

(51) Int. Cl.
*G06F 7/04* (2006.01)
(52) U.S. Cl. .............................. 726/28; 726/26; 713/187
(58) Field of Classification Search .................... 713/187
See application file for complete search history.

(56) References Cited

U.S. PATENT DOCUMENTS

| | | | |
|---|---|---|---|
| 7,111,321 B1 * | 9/2006 | Watts et al. ........................ | 726/2 |
| 2002/0166072 A1 * | 11/2002 | Cromer et al. ................. | 713/202 |
| 2003/0221114 A1 * | 11/2003 | Hino et al. ..................... | 713/189 |
| 2007/0143829 A1 * | 6/2007 | Hinton et al. ..................... | 726/5 |
| 2008/0034412 A1 * | 2/2008 | Wahl ................................ | 726/8 |
| 2010/0122326 A1 * | 5/2010 | Bisbee et al. ..................... | 726/5 |

* cited by examiner

*Primary Examiner* — Matthew B Smithers
(74) *Attorney, Agent, or Firm* — Brill Law Office; Jeffrey Brill

(57) ABSTRACT

To prevent attackers from logging-in with modified passwords, backup copies of passwords are created and stored. At boot time, the stored passwords are compared to the corresponding backup copies to ensure that they have not been modified. This is done during the boot cycle before the attacker is able to login to the computer. If any passwords have been modified, they are replaced with backup copies, thereby preventing the attacker from logging-in with a modified password.

15 Claims, 1 Drawing Sheet

DETECTING AND PREVENTING EXTERNAL MODIFICATION OF PASSWORDS

TECHNICAL FIELD

This invention pertains generally to computer security, and more specifically to detecting and preventing the external modification of passwords.

BACKGROUND ART

If a malicious party gains physical access to a computer, he can boot an alternate operating system from a compact disk and overwrite the portion of the hard drive at which passwords are stored. By overwriting a legitimate password with a non-legitimate one, the attacker can gain unauthorized access to the system. For example, in the case of Microsoft Windows®, a hacker can overwrite a specific registry entry at which a hash of the administrator's password is stored with the hash for a known password. After rebooting the original system, the hacker can use this known password to login as the administrator. Once logged-in as the administrator, the hacker has full access to the computer.

This vulnerability can be overcome by hardware encrypting the entire hard drive. However, this requires the appropriate hardware and software support, and incurs a significant performance penalty to all hard drive access.

It would be desirable to be able to prevent unauthorized access to a computer system through password overwrites without requiring encryption of the hard drive.

SUMMARY

If an attacker has physical access to a computer system, the attacker is able to replace the legitimate password. This allows the attacker to login and take control of the system. To prevent this, backup copies of passwords are created and stored. At boot time, the stored passwords are compared to the corresponding backup copies to ensure that they have not been modified. This is done during the boot cycle before the attacker is able to login to the computer. If any passwords have been modified, a specific policy can be implemented. This could include replacing the password hash with backup copies, thereby preventing the attacker from logging-in with a modified password. It might also include notification of a system administrator that such an action has taken place.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
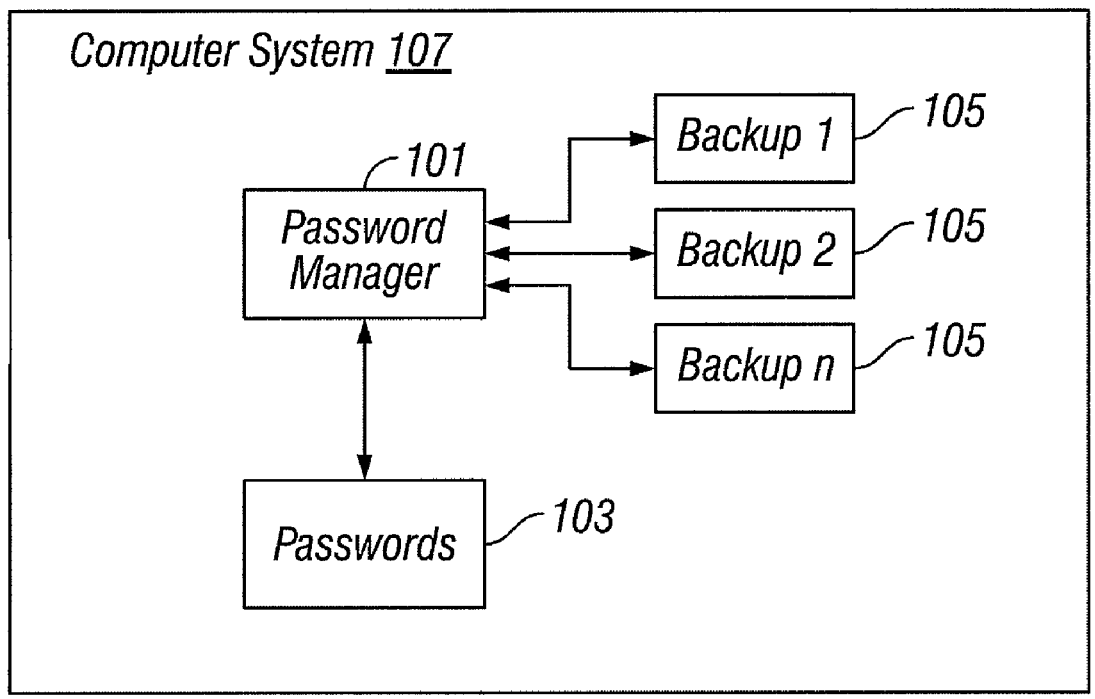
FIG. 1 is a block diagram illustrating a system in which a password manager detects and prevents the external modification of passwords, according to some embodiments of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates a system 100 in which password manager 101 detects and prevents the external modification of passwords 103, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, the password manager 101 stores, at least one backup copy 105 of each password 103 to protect. In one embodiment the backups 105 are stored in the format in which the passwords 103 are stored by the operating system (e.g., hashes in the case of Windows). Of course, the backups 105 can be stored in any format as desired. For example, the backups 105 can be hidden, encrypted, compressed, or otherwise further protected from unauthorized access. In the embodiments illustrated in FIG. 1, multiple backup copies 105 of each password 103 to protect are stored in various locations on the computer system 107. In another embodiment, only a single backup 105 of each password 103 is stored. In other embodiments, some or all backup copies 105 can be stored on external media and/or remote computer systems as desired (not illustrated).

During the boot process, the password manager 101 compares the real passwords 103 (e.g., in the case of Windows the hashes stored in the registry) to at least one backup copy 105 thereof. If the password manager 101 finds any modified passwords 103, the password manager 101 enforces the preset security policy. This policy can include the prevention of the login by replacing any modified passwords 103 with the appropriate backups 105. The password manager 101 does this processing early in the boot cycle, before the attacker has a chance to login. The implementation mechanics of executing such processing at the appropriate point in the boot cycle is known to those of ordinary skill in the relevant art, and the use of these techniques within the context of the present invention will be readily apparent to those of such a skill level in light of this specification.

In addition to the security policy discussed above, the password manager 101 can also execute any other desired security policy in response to detecting an overwritten password 103. For example, the password manager 101 could restrict access to the computer 107, lock the computer 107, encrypt or even (in an extreme case) destroy critical data on the drive, send an alert to a third party, etc.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer-implemented method for detecting and preventing external modification of passwords, the method comprising the steps of:
   comparing at least one stored password to at least one backup copy of the at least one stored password, said comparing being executed at a stage in an operating system boot cycle prior to a stage at which a user can login to a corresponding computer;
   determining whether at least one stored password does not match at least one corresponding backup copy; and
   responsive to determining that at least one stored password does not match at least one corresponding backup copy, executing a predetermined security policy, comprising replacing the at least one non-matching stored password with at least one corresponding backup copy.

2. The method of claim 1 wherein comparing at least one stored password to at least one backup copy of the at least one stored password further comprises:
   comparing at least one stored hash of a password to at least one backup copy of a hash of that password.

3. The method of claim 1 further comprising:
   creating and storing at least one backup copy of at least one stored password.

4. The method of claim 3 wherein creating and storing at least one backup copy of at least one stored password further comprises:
   creating and storing at least one backup copy of at least one stored hash of a password.

5. The method of claim 1 wherein executing a predetermined security policy further comprising performing at least one step from a group of steps consisting of:
   preventing login to the computer with the at least one non-matching stored password;
   locking the computer;
   restricting access to the computer;
   encrypting at least some data on the computer;
   deleting at least some data on the computer; and
   sending at least one alert to at least one external destination.

6. At least one non-transitory computer readable medium containing a computer program product for detecting and preventing external modification of passwords, the computer program product comprising:
   program code for comparing at least one stored password to at least one backup copy of the at least one stored password, said comparing being executed at a stage in an operating system boot cycle prior to a stage at which a user can login to a corresponding computer;
   program code for determining whether at least one stored password does not match at least one corresponding backup copy; and
   program code for, responsive to determining that at least one stored password does not match at least one corresponding backup copy, executing a predetermined security policy, comprising replacing the at least one non-matching stored password with at least one corresponding backup copy.

7. The computer program product of claim 6 wherein the program code for comparing at least one stored password to at least one backup copy of the at least one stored password further comprises:
   program code for comparing at least one stored hash of a password to at least one backup copy of a hash of that password.

8. The computer program product of claim 6 further comprising:
   program code for creating and storing at least one backup copy of at least one stored password.

9. The computer program product of claim 8 wherein the program code for creating and storing at least one backup copy of at least one stored password further comprises:
   creating and storing at least one backup copy of at least one stored hash of a password.

10. The computer program product of claim 6 wherein the program code for executing a predetermined security policy further comprises program code for performing at least one additional step from a group of steps consisting of:
    preventing login to the computer with the at least one non-matching stored password;
    locking the computer;
    restricting access to the computer;
    encrypting at least some data on the computer;
    deleting at least some data on the computer; and
    sending at least one alert to at least one external destination.

11. A computer system for detecting and preventing external modification of passwords, the computer system comprising:
    means for comparing at least one stored password to at least one backup copy of the at least one stored password, said comparing being executed at a stage in an operating system boot cycle prior to a stage at which a user can login to a corresponding computer;
    means for determining whether at least one stored password does not match at least one corresponding backup copy; and
    means for, responsive to determining that at least one stored password does not match at least one corresponding backup copy, executing a predetermined security policy, comprising replacing the at least one non-matching stored password with at least one corresponding backup copy.

12. The computer system of claim 11 wherein the means for comparing at least one stored password to at least one backup copy of the at least one stored password further comprise:
    means for comparing at least one stored hash of a password to at least one backup copy of a hash of that password.

13. The computer system of claim 11 further comprising:
    means for creating and storing at least one backup copy of at least one stored password.

14. The computer system of claim 13 wherein the means for creating and storing at least one backup copy of at least one stored password further comprise:
    creating and storing at least one backup copy of at least one stored hash of a password.

15. The computer system of claim 11 wherein the means for executing a predetermined security policy further comprise means for performing at least one additional step from a group of steps consisting of:
    preventing login to the computer with the at least one non-matching stored password;
    locking the computer;
    restricting access to the computer;
    encrypting at least some data on the computer;
    deleting at least some data on the computer; and
    sending at least one alert to at least one external destination.

* * * * *